(12) United States Patent
Ueda et al.

(10) Patent No.: US 8,948,505 B2
(45) Date of Patent: Feb. 3, 2015

(54) IMAGE PROCESSING APPARATUS, IMAGE PROCESSING METHOD, PROGRAM AND IMAGING APPARATUS

(75) Inventors: Atsushi Ueda, Tokyo (JP); Daisuke Satou, Kanagawa (JP); Jun Minakuti, Tokyo (JP)

(73) Assignee: Sony Corporation, Tokyo (JP)

(*) Notice: Subject to any disclaimer, the term of this patent is extended or adjusted under 35 U.S.C. 154(b) by 301 days.

(21) Appl. No.: 13/457,691

(22) Filed: Apr. 27, 2012

(65) Prior Publication Data

US 2012/0294522 A1 Nov. 22, 2012

(30) Foreign Application Priority Data

May 18, 2011 (JP) ................................. 2011-111350

(51) Int. Cl.
*G06K 9/00* (2006.01)
*H04N 1/62* (2006.01)

(52) U.S. Cl.
CPC . *H04N 1/62* (2013.01); *H04N 1/622* (2013.01)
USPC ........................................................ 382/165

(58) Field of Classification Search
USPC ........................... 382/128, 165, 190, 199, 203
See application file for complete search history.

(56) References Cited

U.S. PATENT DOCUMENTS

| 2007/0030501 | A1 | 2/2007 | Sanami |
| 2008/0231876 | A1 | 9/2008 | Harada |
| 2008/0260245 | A1 | 10/2008 | Matsumoto |
| 2009/0148014 | A1* | 6/2009 | Kanda ........................... 382/128 |
| 2011/0216189 | A1 | 9/2011 | Nagamine et al. |

FOREIGN PATENT DOCUMENTS

| EP | 1 686 787 A1 | 8/2006 |
| JP | 05-274372 A | 10/1993 |
| JP | 06-098232 A | 4/1994 |

* cited by examiner

*Primary Examiner* — Duy M Dang
(74) *Attorney, Agent, or Firm* — Wolf, Greenfield & Sacks, P.C.

(57) ABSTRACT

Provided is an image processing apparatus, including an extraction color region determination unit which performs a process of determining an extraction color region including at least a partial region in an image using color information of an input image signal, and an image processing unit which performs image processing on the extraction color region of the input image signal determined by the extraction color region determination unit and/or the remaining region of the input image signal excluding the extraction color region, to obtain an output image signal.

16 Claims, 11 Drawing Sheets

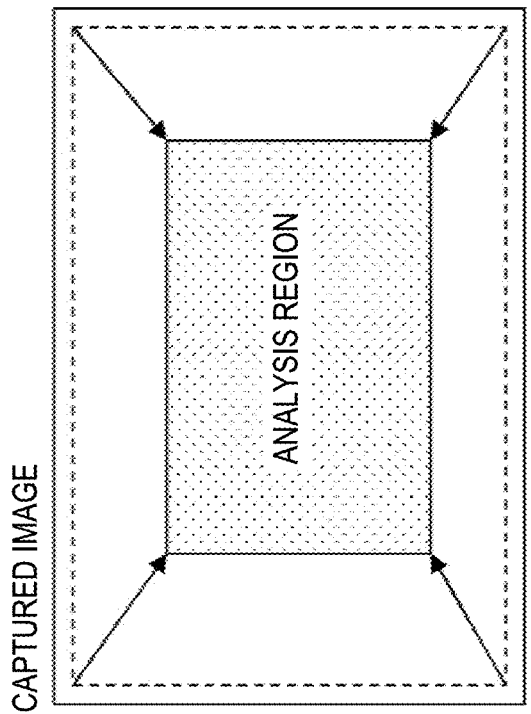
FIG.3A
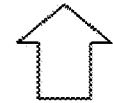
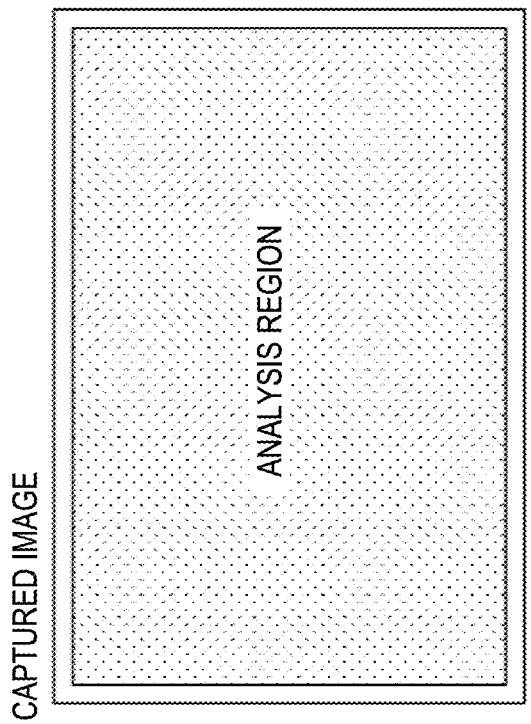
FIG.3B

IMAGE PROCESSING APPARATUS, IMAGE PROCESSING METHOD, PROGRAM AND IMAGING APPARATUS

BACKGROUND

The disclosure relates to an image processing apparatus, an image processing method, a program, and an imaging apparatus. In particular, the disclosure relates to an image processing apparatus that extracts at least one color region from color regions included in an input image signal and performs image processing, and the like.

Conventionally, obtaining an output image signal by performing different kinds of processing on a specific region and remaining region in an image of an input image signal has been known. For example, implementing the so-called partial color effect by performing achromatic coloring on a region excluding a color region designated by a user has been known. Also, for example, two-dimensionally specifying and coloring only a main subject in a focus state has been disclosed in Patent Document 1, Japanese Patent Publication No. Heisei 06-098232.

SUMMARY

Conventionally, performing image processing by automatically determining at least one extraction color region using color information of an input image signal has not been known.

A purpose of the present technology is to perform image processing by automatically determining at least one extraction color region using color information of an input image signal.

The concept of the present technology is an image processing apparatus which includes an extraction color region determination unit that performs a process of determining an extraction color region including at least a partial region in an image using color information of an input image signal, and an image processing unit that performs image processing on the extraction color region of the input image signal determined by the extraction color region determination unit and/or remaining region of the input image signal excluding the extraction color region, to obtain an output image signal.

With the present technology, the process of determining the extraction color region including at least the partial region in the image using the color information of the input image signal is performed by the extraction color region determination unit. For example, when it is impossible to determine the extraction color region in a first image region, the extraction color region determination unit may perform the process of determining the extraction color region in a second image region that is smaller than the first image region. In this way, by downsizing an image region, it is possible to reliably determine an extraction color region.

In this case, for example, the extraction color region determination unit performs a process of assigning every pixel or every block including a predetermined number of pixels in the first image region to any one of a plurality of color regions, and, as a result thereof, when there are color regions of which frequencies exceed a threshold value, the extraction color region determination unit determines at least one color region among the color regions as the extraction color region, and when there is no region of which a frequency exceeds the threshold value, the extraction color region determination unit performs the process of determining the extraction color region in the second image region that is smaller than the first image region.

In this case, for example, the extraction color region determination unit determines an image region obtained by downsizing the first image region toward a screen center as the second image region. Also, in this case, the extraction color region determination unit determines, for example, an image region obtained by downsizing the first image region toward a focus point on the screen as the second image region. In this way, by downsizing a region toward a focus point, it is possible to determine a color region preferred by a user as the extraction color region.

For example, the extraction color region determination unit may perform the process of assigning every pixel or every block including the predetermined number of pixels in a predetermined image region to any one of the plurality of color regions, and determine the extraction color region on the basis of a frequency of each color region. In this case, when there are a plurality of color regions of which frequencies exceed the threshold value, the extraction color region determination unit may determine a predetermined number of color regions in order of decreasing frequency as the extraction color region.

Also, in this case, when there are a plurality of color regions of which frequencies exceed the threshold value, the extraction color region determination unit may prompt the user to select the extraction color region. Further, in this case, a user selection acquisition unit that displays N regions (N is an integer equal to or greater than 2) in decreasing frequency order among the plurality of color regions of which the frequencies exceed the threshold value as candidate color regions on a display unit, and prompts the user to select the extraction color region on the basis of the display of the display unit may be further included. In this case, it is possible to select a color region preferred by the user as the extraction color region.

Here, the display unit that displays the candidate color regions does not need to be in the image processing apparatus, and may be an external device. Also, a user manipulation unit for the user to select the extraction color region does not need to be in the image processing apparatus, and may be an external device such as a remote controller or a device over a network.

By the image processing unit, image processing is performed on the extraction color region of the input image signal determined by the extraction color region determination unit and/or the remaining region of the input image signal excluding the extraction color region, so that the output image signal is obtained. For example, a process of emphasizing saturation is performed on the extraction color region of the input image signal, and also, for example, a process of achromatic coloring is performed on the remaining region excluding the extraction color region of the input image signal. In this way, with the present technology, it is possible to automatically determine at least one extraction color region using color information of an input image signal and perform image processing. For this reason, it is possible to reliably implement, for example, the partial color effect.

In addition, with the present technology, for example, the extraction color region determination unit may update a determined extraction color region when a photography condition of an input image signal varies. In this way, it is possible to prevent an extraction color region from carelessly varying.

According to the present technology described above, it is possible to automatically determine at least one extraction color region using color information of an input image signal and perform image processing.

BRIEF DESCRIPTION OF THE DRAWINGS

FIGS. 3A-3B illustrate an example of a method of downsizing a color information analysis region (example of downsizing toward a screen center);

DETAILED DESCRIPTION OF THE EMBODIMENT(S)

Hereinafter, preferred embodiments of the present disclosure will be described in detail with reference to the appended drawings. Description will be made in the following sequence.

1. First Embodiment
2. Second Embodiment
3. Variation

<1. First Embodiment>

[Configuration Example of Image Processing Apparatus]

Figure 1:
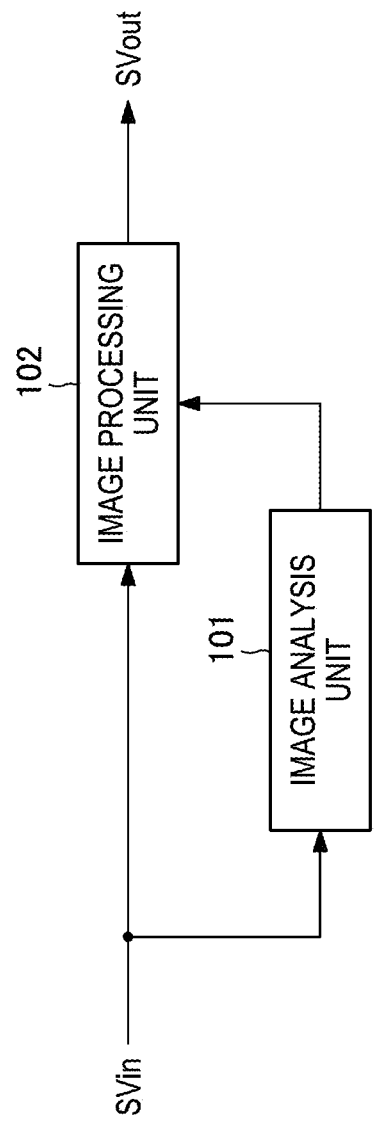
FIG. 1 is a block diagram showing a configuration example of an image processing apparatus according to a first embodiment of the disclosure.

FIG. 1 shows a configuration example of an image processing apparatus 100 according to a first embodiment of the disclosure. The image processing apparatus 100 includes an image analysis unit 101 and an image processing unit 102. The image analysis unit 101 constitutes an extraction color region determination unit.

The image analysis unit 101 performs a process of determining an extraction color region including at least a partial region in an image using color information of an input image signal SVin. Here, the input image signal SVin is a color image signal, and consists of, for example, a luminance signal Y, a red chrominance signal Cr and a blue chrominance signal Cb. The input image signal SVin is, for example, a captured image signal obtained by an imaging unit, a replay image signal, which is obtained by recording the captured image signal in a recording medium first and then replaying the captured image signal from the recording medium, or the like.

When it is impossible to determine an extraction color region in a first image region, the image analysis unit 101 performs a process of determining an extraction color region in a second image region that is smaller than the first image region. In this case, the image analysis unit 101 performs a process of assigning every pixel or every block including a predetermined number of pixels in the first image region to any one of a plurality of color regions. Thereafter, when there are color regions of which frequencies exceed a threshold value, the image analysis unit 101 determines at least one color region among the color regions as an extraction color region.

On the other hand, when there is no region of which a frequency exceeds the threshold value, the image analysis unit 101 performs the process of determining an extraction color region in the second image region that is smaller than the first image region. In other words, the image analysis unit 101 performs a process of assigning every pixel or every block including a predetermined number of pixels in the second image region to any one of the plurality of color regions. Thereafter, when there are color regions of which frequencies exceed the threshold value, the image analysis unit 101 determines at least one color region among the color regions as an extraction color region.

From then on, the image analysis unit 101 repeats the process of determining an extraction color region, by replacing a second image region with the first image region and replacing a region, which is smaller than a first image region, with the second image region, when there is no region of which a frequency exceeds a threshold value.

Figure 2:
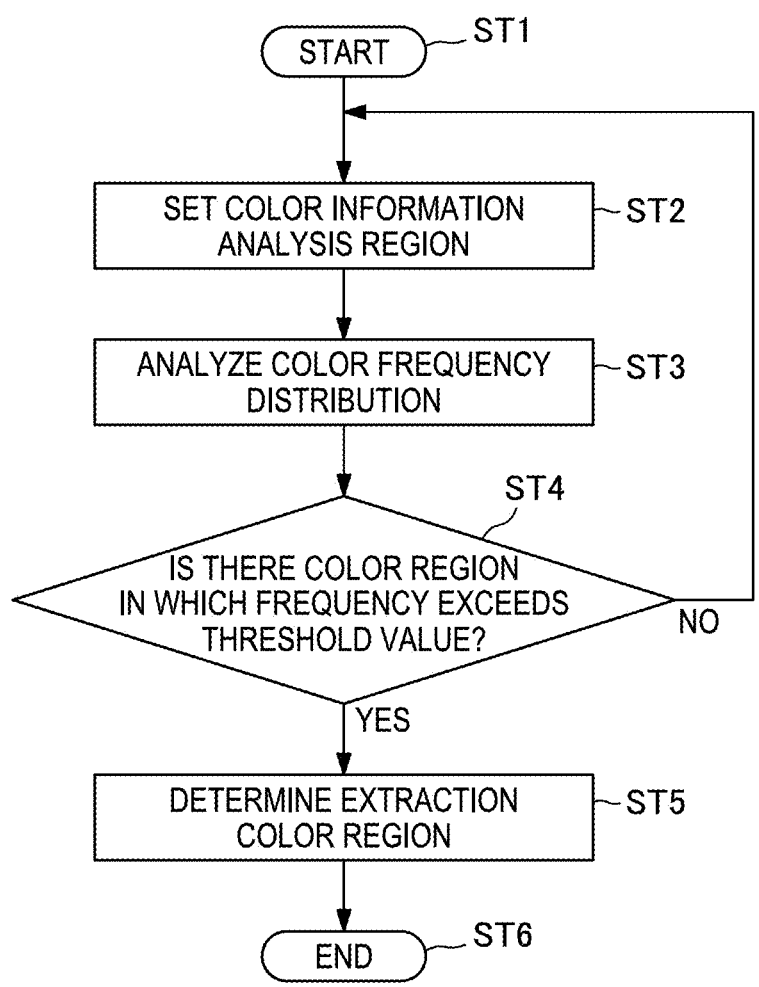
FIG. 2 is a flowchart showing a processing sequence of an image analysis unit constituting an image processing apparatus.

The flowchart of FIG. 2 shows a processing sequence of the image analysis unit 101. The image analysis unit 101 performs a process on every frame or every predetermined number of frames according to the flowchart. The image analysis unit 101 starts processing in a step ST1, and then proceeds to a process of a step ST2. In the step ST2, the image analysis unit 101 sets a color information analysis region.

At first, the image analysis unit 101 sets an almost entire screen as the color information analysis region, and then gradually downsizes the region every time the process proceeds back to the step ST2. In this case, the color information analysis region before the change constitutes a first image region and a color information analysis region after the change constitutes a second image region. FIGS. 3A-3B show an example of a method of downsizing a color information analysis region. FIG. 3 (a) shows an initial state in which an entire screen is set as a color information analysis region. In this example, the color information analysis region is downsized toward a screen center as shown in FIG. 3 (b).

Figure 4A:
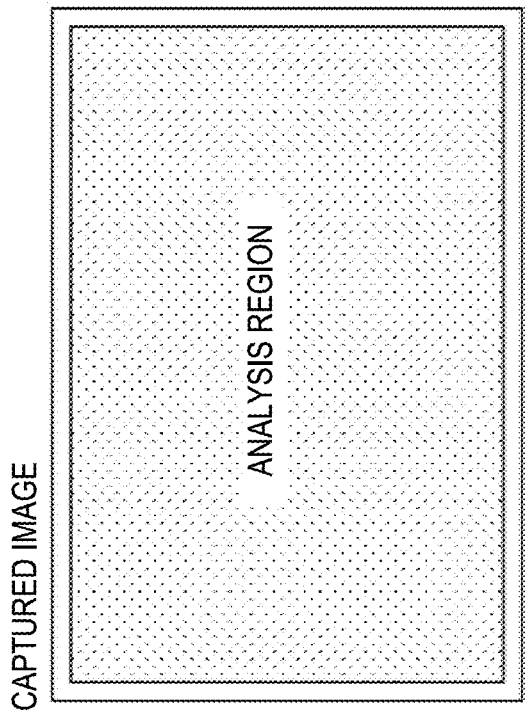
FIGS. 4A-4B illustrate another example of a method of downsizing a color information analysis region (example of downsizing toward a focus point on a screen)
Figure 4B:
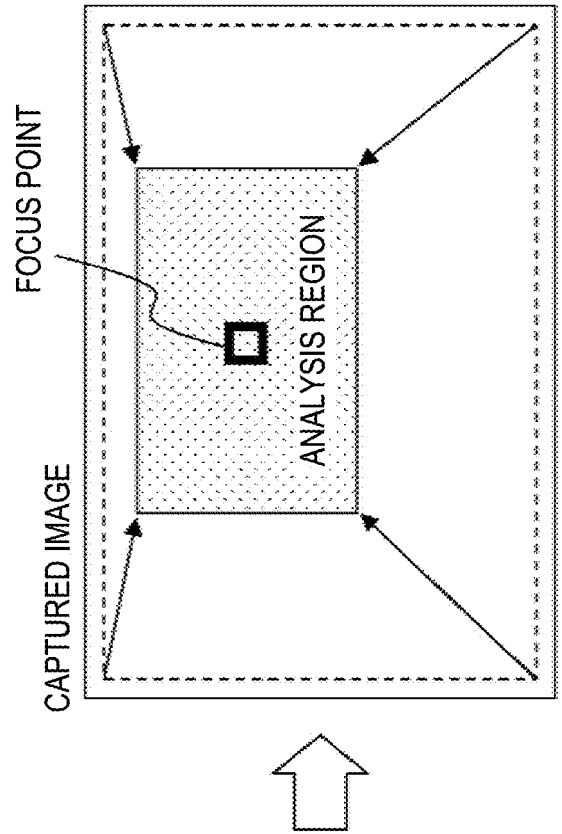

FIGS. 4A-4B show another example of a method of downsizing a color information analysis region. FIG. 4 (a) shows an initial state in which an entire screen is set as a color information analysis region. In this example, the color information analysis region is downsized toward a focus point on the screen as shown in FIG. 4 (b). In this case, the image analysis unit 101 acquires information on the focus point and the input image signal SVin from the imaging unit or a replay unit. Detailed description of an imaging unit in a digital still camera (imaging apparatus) will be omitted, but the digital still camera can be focused on a subject present at a predetermined position on a screen by, for example, a phase-difference autofocus method or the like.

Although not shown in the drawings, it is also possible to downsize a color information analysis region toward a detection position of a specific object, such as a face, as still another example of a method of downsizing a color information analysis region. In this case, the image analysis unit 101 acquires information on the detection position of the specific object and the input image signal SVin.

Referring back to FIG. 2, next, the image analysis unit 101 performs color frequency distribution analysis in a step ST3. In other words, the image analysis unit 101 performs a process of assigning every pixel or every block including a predetermined number of pixels, for example, 8×8 pixels, to any one of the plurality of color regions. On the basis of color information on every pixel or every block, the image analysis unit 101 performs the assignment process.

The color information may be hue information, saturation information, hue and saturation information, hue-equivalent information, and the like. For example, the red chrominance signal Cr and the blue chrominance signal Cb are used as the hue information. Also, for example, B/G and R/G are used as the hue-equivalent information. Here, B denotes a blue signal, R denotes a red signal, and G denotes a green signal.

Figure 5:
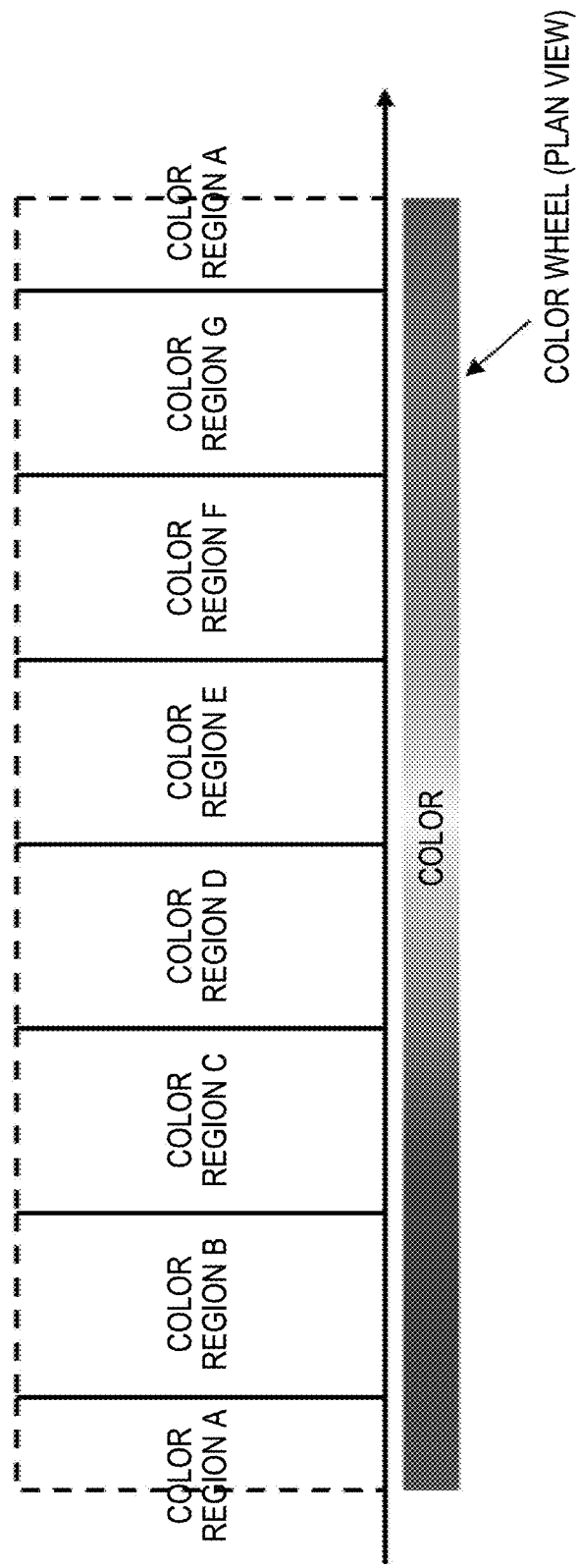
FIG. 5 is a diagram showing an example of color region classification for assignment processing.

Additionally, a case of performing the above-described assignment process on the basis of hue information on every pixel or every block will be described by way of example. In this case, hues are classified into a predetermined number of color regions. FIG. 5 shows a classification example classified into seven color regions, that is, color regions A to G. Here, this example is obtained by cutting off a color wheel along the color region A and spreading the color wheel.

The image analysis unit 101 determines to which one of the color regions A to G each pixel or each block belongs using the red chrominance signal Cr and the blue chrominance signal Cb, and performs assignment. Here, the red chrominance signal Cr and the blue chrominance signal Cb of a block are determined to be averages, medians, or the like of the red chrominance signals Cr and the blue chrominance signals Cb of the predetermined number of pixels included in the block, respectively.

Figure 6:
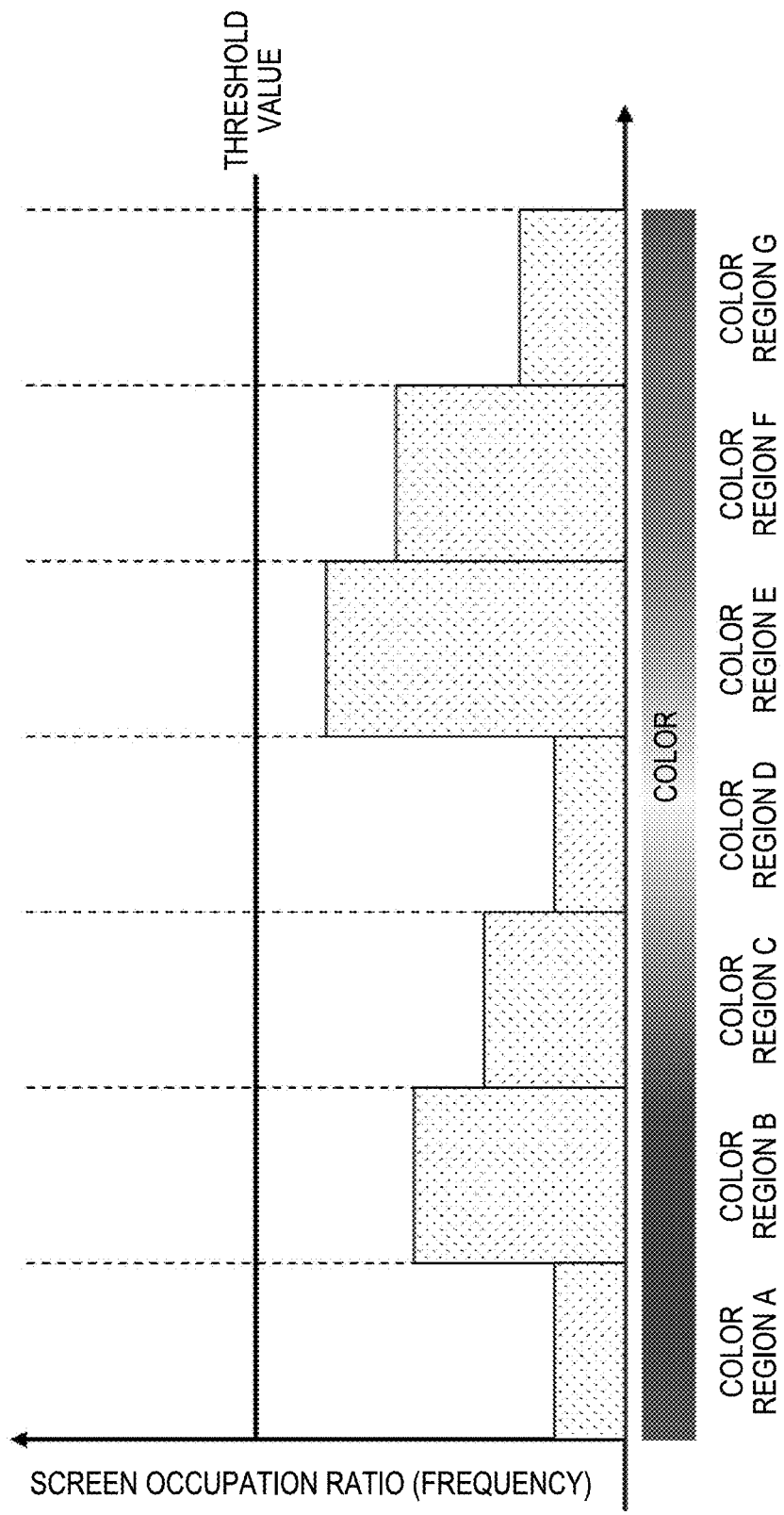
FIG. 6 is a diagram showing an example of assignment process results (in which all frequencies of color regions A to G are less than a threshold value)
Figure 7:
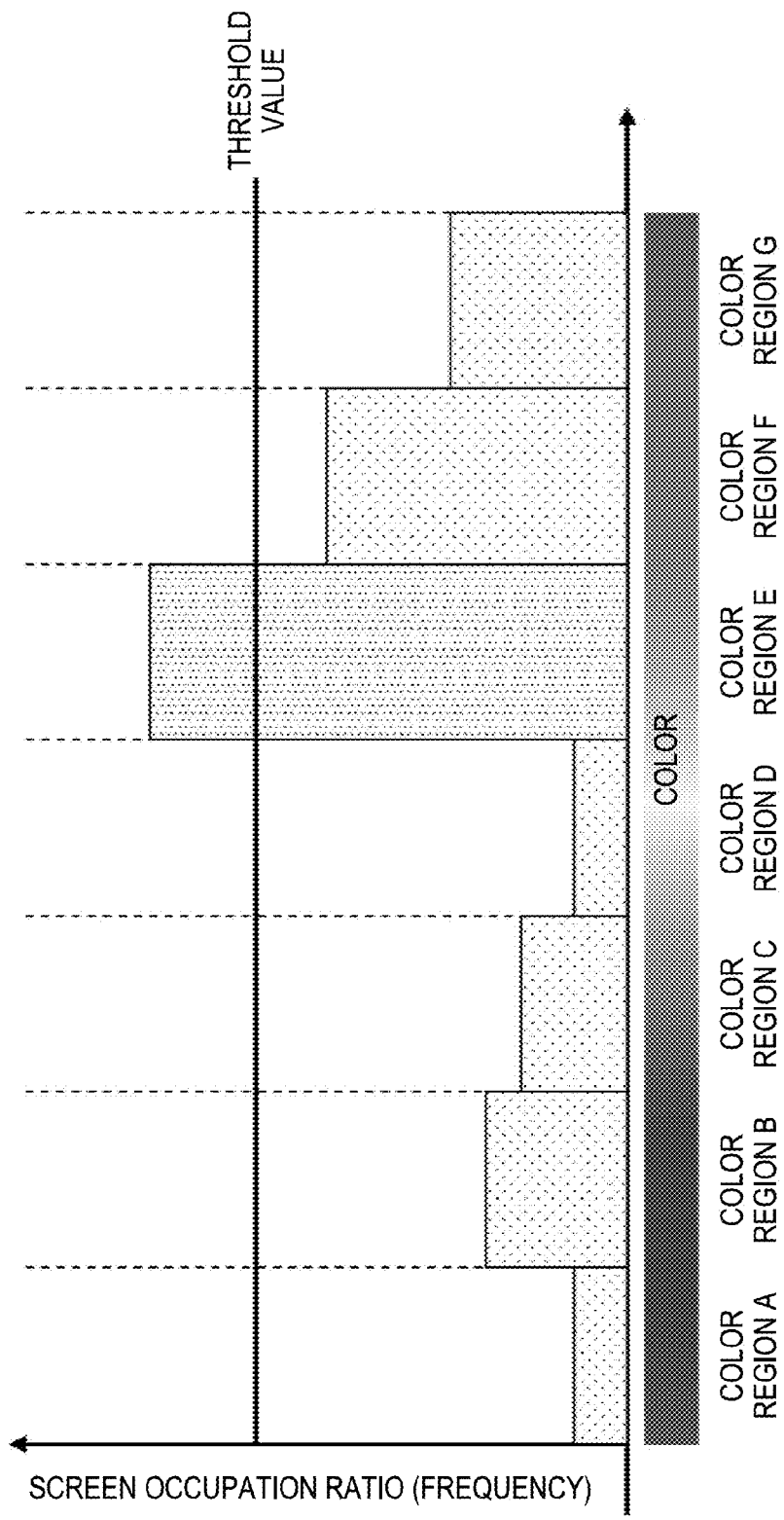
FIG. 7 is a diagram showing an example of assignment process results (in which, among frequencies of color regions A to G, the frequency of the color region E exceeds a threshold value, and the frequencies of the other regions are less than the threshold value)
Figure 8:
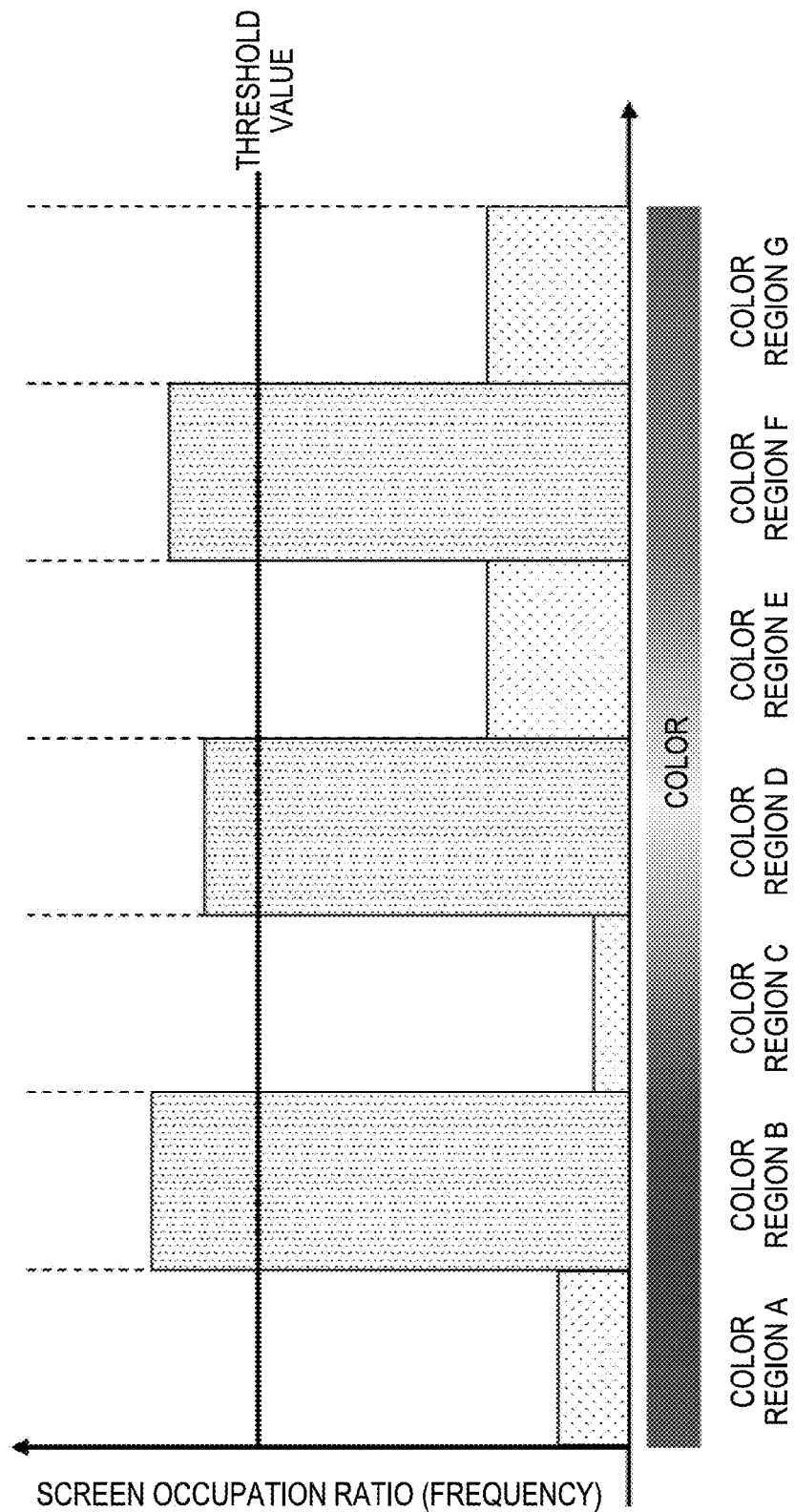
FIG. 8 is a diagram showing an example of assignment process results (in which, among frequencies of color regions A to G, the frequencies of the color regions B, D and F exceed a threshold value, and the frequencies of the other regions are less than the threshold value)

FIG. 6 to FIG. 8 show examples of assignment process results, respectively. These examples show frequencies of respective color regions as screen occupation ratios. Here, a 「screen」 denotes the 「color information analysis region」 set in the step ST2. In the example of FIG. 6, all frequencies of the color regions A to G are less than the threshold value. In the example of FIG. 7, among frequencies of the color regions A to G, the frequency of the color region E exceeds the threshold value, and the frequencies of the other color regions are less than the threshold value. In the example of FIG. 8, among frequencies of the color regions A to G, the frequencies of the color regions B, D and F exceed the threshold value, and the frequencies of the other color regions are less than the threshold value. Here, the threshold value is set to, for example, about 30% to 40% of the area of the entire screen, but is not limited thereto.

Referring back to FIG. 2, next, the image analysis unit 101 determines in a step ST4 whether or not there is a color region of which a frequency exceeds the threshold value. When it is determined that there is no color region of which a frequency exceeds the threshold value (see FIG. 6), the image analysis unit 101 proceeds back to the step ST2 to change the color information analysis region. In this case, a color information analysis region after the change (a second image region) is downsized in comparison with the color information analysis region before the change (a first image region) (see FIG. 3 and FIG. 4).

On the other hand, when it is determined that there is a color region of which a frequency exceeds the threshold value (see FIG. 7 and FIG. 8), the image analysis unit 101 proceeds to a process of a step ST5. In this step ST5, the image analysis unit 101 determines at least one color region among the color regions of which the frequencies exceed the threshold value as an extraction color region, and outputs information on the extraction color region.

In this case, when there is only one color region of which a frequency exceeds the threshold value (see FIG. 7), the image analysis unit 101 determines the color region as an extraction color region. Also, in this case, when there are a plurality of color regions of which frequencies exceed the threshold value (see FIG. 8), the image analysis unit 101 determines, for example, one color region or a predetermined number of color regions in decreasing frequency order among the plurality of color regions as extraction color regions.

After the process of the step ST5, the image analysis unit 101 finishes processing in a step ST6.

Referring back to FIG. 1, the image processing unit 102 performs image processing on the input image signal SVin on the basis of the extraction color region determined by the image analysis unit 101, and thereby obtains an output image signal SVout. In this case, the image processing unit 102 performs image processing on the extraction color region of the input image signal SVin and/or the remaining region of the input image signal SVin excluding the extraction color region. In other words, the image processing unit 102 performs image processing on at least one region between the extraction region of the input image signal SVin and the remaining region of the input image signal SVin excluding the extraction region. When the image processing unit 102 performs image processing on both of the regions, different kinds of image processing are performed on the extraction region and the remaining region excluding the extraction region. The image processing unit 102 performs, for example, a process of emphasizing saturation on the extraction color region of the input image signal SVin. Also, the image processing unit 102 performs, for example, achromatic coloring, that is, a process of dropping saturation to zero, on the remaining region of the input image signal SVin excluding the extraction color region.

Operation of the image processing apparatus 100 shown in FIG. 1 will be described. The input image signal SVin, for example, a captured image signal or a replay image signal, is supplied to the image analysis unit 101 and the image processing unit 102. The image analysis unit 101 determines an extraction color region including at least a partial region in an image using color information of the input image signal SVin, and supplies information on the region to the image processing unit 102.

The image processing unit 102 performs image processing on the input image signal SVin on the basis of the extraction color region determined by the image analysis unit 101, thereby obtaining the output image signal SVout. In this case, the image processing unit 102 performs image processing on the extraction color region of the input image signal SVin and/or the remaining region of the input image signal SVin excluding the extraction color region. For example, a process of achromatic coloring is performed on the remaining region of the input image signal SVin excluding the extraction color region, implementing the so-called partial color effect.

As described above, in the image processing apparatus 100 shown in FIG. 1, the image analysis unit 101 automatically determines at least one extraction color region using color information of the input image signal SVin. For this reason, the image processing unit 102 can reliably perform image processing on the input image signal SVin on the basis of information on the extraction color region. For example, the process of achromatic coloring is performed on the remaining region of the input image signal SVin excluding the extraction color region, so that the so-called partial color effect can be reliably implemented.

Also, when it is impossible to determine an extraction color region, the image analysis unit 101 in the image processing apparatus 100 shown in FIG. 1 changes a color information analysis region with a downsized region and performs the process of determining an extraction color region again. For this reason, it is possible to automatically determine at least one extraction color region.

General digital still cameras include a camera that has a focus point for implementing autofocus, and a camera of which a focus position can be freely set by a user. In general, since an object desired to be in focus becomes a main subject, there is a high possibility that the object includes many color regions desired to be extracted. For this reason, by downsizing a color information analysis region toward a focus point, it is possible to determine a color region more preferred by a user as an extraction color region.

In the image processing apparatus 100 shown in FIG. 1, the input image signal SVin consists of the luminance signal Y, the red chrominance signal Cr and the blue chrominance signal Cb, but may consist of three primary color signals, that is, the red signal R, the green signal G and the blue signal B. In this case, the image analysis unit 101 and the image processing unit 102 may perform processing using the red signal R, the green signal G and the blue signal B, or perform processing after appropriately converting the red signal R, the green signal G and the blue signal B into the luminance signal Y, the red chrominance signal Cr and the blue chrominance signal Cb.

<2. Second Embodiment>
[Configuration Example of Digital Still Camera]

Figure 9:
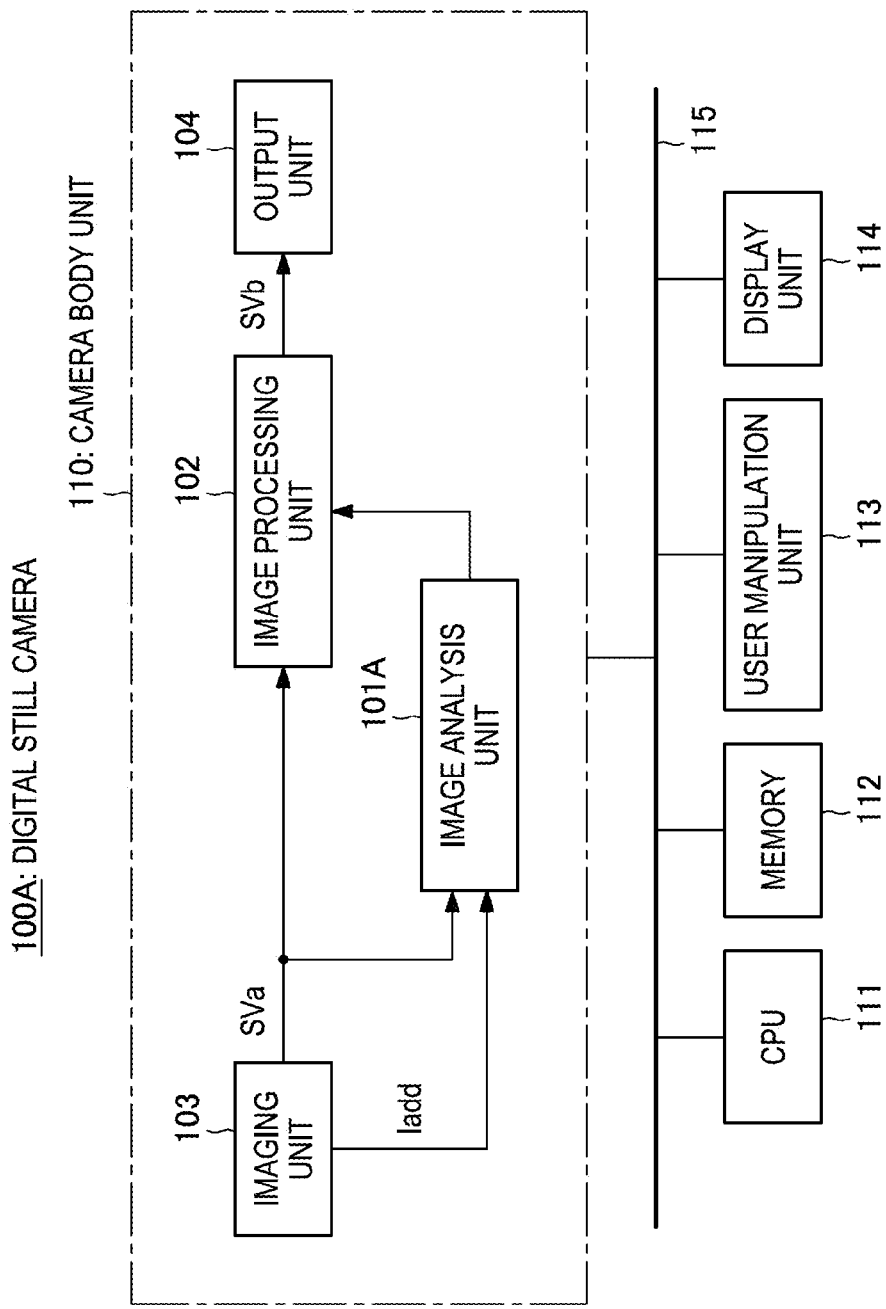
FIG. 9 is a block diagram showing a configuration example of a digital still camera (imaging apparatus) according to a second embodiment of the disclosure.

FIG. 9 shows a configuration example of a digital still camera (imaging apparatus) 100A according to a second embodiment of the disclosure. In FIG. 9, the same symbols or corresponding symbols are given to parts corresponding to those of FIG. 1, and detailed description thereof will be appropriately omitted. The digital still camera 100A includes a camera body unit 110, a CPU 111, a memory 112, a user manipulation unit 113 and a display unit 114, and the respective units are connected with each other by an internal bus 115.

The CPU 111 controls operation of the respective units of the digital still camera 100A. Although not shown in the drawings, the memory 112 consists of a flash ROM, a DRAM, and the like. The flash ROM performs storage of control software and data. The DRAM constitutes a work area of the CPU 111. The CPU 111 loads software or data read out from the flash ROM into the DRAM and runs the software, thereby controlling the respective units of the digital still camera 100A.

The user manipulation unit 113 and the display unit 114 constitute a user interface. The user manipulation unit 113 consists of a key, a button or a dial placed on a case of the digital still camera 100A that is not shown in the drawing, touch panels placed on a display surface of the display unit 114, or the like. The display unit 114 consists of a display panel such as a Liquid Crystal Display (LCD).

The camera body unit 110 includes an imaging unit 103, an image analysis unit 101A, an image processing unit 102 and an output unit 104. The imaging unit 103 photographs a subject to obtain a captured image signal SVa, and outputs the captured image signal SVa. The captured image signal SVa is a color image signal, and consists of, for example, a luminance signal Y, a red chrominance signal Cr and a blue chrominance signal Cb.

The imaging unit 103 has an autofocus function, such as the phase-different autofocus method, and can focus on a subject present at a predetermined position on a screen. Also, the imaging unit 103 has a function of detecting a specific object such as a face. The imaging unit 103 outputs not only the aforementioned captured image signal SVa but also additional information Iadd including information on a focus point, information on a detection position of a specific object, and the like.

Like the image analysis unit 101 in the image processing apparatus 100 shown in FIG. 1, the image analysis unit 101A performs a process of determining an extraction color region including at least a partial region in an image using color information of the captured image signal SVa. When it is impossible to determine an extraction color region in a first image region, the image analysis unit 101A performs a process of determining an extraction color region in a second image region that is smaller than the first image region.

In this case, the image analysis unit 101A performs a process of assigning every pixel or every block including a predetermined number of pixels in the first image region to any one of a plurality of color regions. Thereafter, when there are color regions of which frequencies exceed a threshold value, the image analysis unit 101A determines at least one color region among the color regions as an extraction color region. On the other hand, when there is no region of which a frequency exceeds the threshold value, the image analysis unit 101A performs the process of determining an extraction color region in the second image region that is smaller than the first image region.

When there is a change in photography state, the image analysis unit 101A updates the determined extraction color region. Here, the change in photography state denotes a change in photography state occurring when a user clearly performs change of an exposure mode, zoom handling, and the like using the user manipulation unit 113. In this way, it is possible to prevent the extraction color region from gradually varying due to minute difference in view angle or motion of the subject that the user does not intend.

Figure 10:
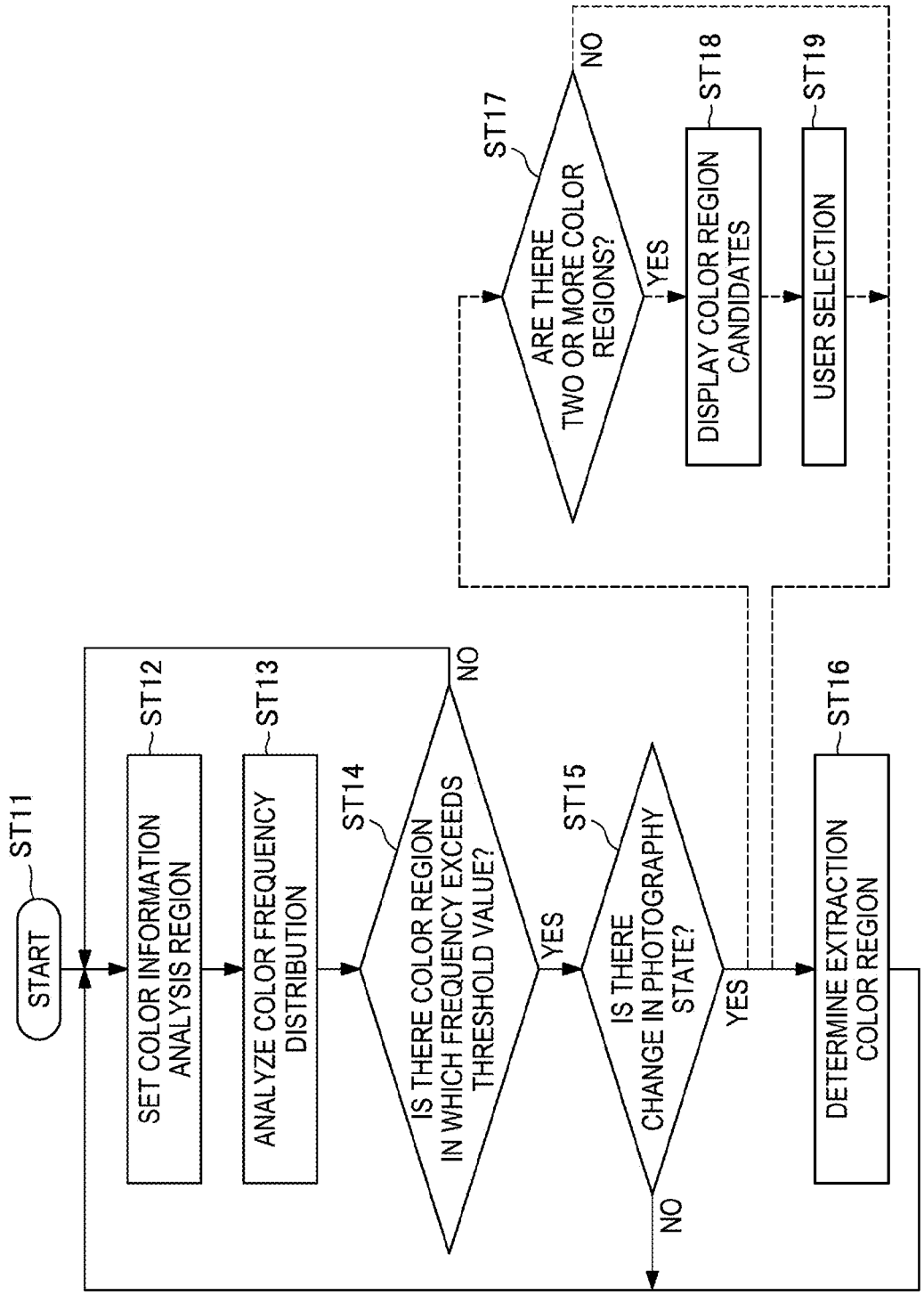
FIG. 10 is a flowchart showing a processing sequence of an image analysis unit constituting a digital still camera.

The flowchart of FIG. 10 shows a processing sequence of the image analysis unit 101A. The image analysis unit 101A starts processing in a step ST11 on the basis of, for example, initiation manipulation of the user using the user manipulation unit 113, and then proceeds to a process of a step ST12. In the step ST12, the image analysis unit 101A sets a color information analysis region, like the process performed by the image analysis unit 101 of the image processing apparatus 100 of FIG. 1 in the step ST2 of FIG. 2.

At first, the image analysis unit 101A sets an entire screen as the color information analysis region, and then gradually downsizes the region every time there is no color region of which a frequency exceeds the threshold value and the process proceeds back to the step ST12. Here, the color information analysis region before the change constitutes a first image region and a color information analysis region after the change constitutes a second image region. In this case, for example, the color information analysis region is downsized toward a screen center (see FIG. 3).

Also, in this case, the color information analysis region is downsized toward a focus point on the screen on the basis of, for example, the information on the focus point included as the additional information from the imaging unit 103 (see FIG. 4). Further, in this case, the color information analysis region is downsized toward the detection position of the specific object on the screen on the basis of, for example, the information on the detection position of the specific object included in the additional information from the imaging unit 103.

Next, the image analysis unit 101A performs color frequency distribution analysis in a step ST13, like the process performed by the image analysis unit 101 of the image processing apparatus 100 of FIG. 1 in the step ST3 of FIG. 2. In other words, the image analysis unit 101A performs a process of assigning every pixel or every block including a predetermined number of pixels, for example, 8×8 pixels, to any one of the plurality of color regions. On the basis of color information on every pixel or every block, the image analysis unit 101A performs the assignment process.

Next, in a step ST14, the image analysis unit 101A determines whether or not there is a color region of which a frequency exceeds the threshold value. When it is determined that there is no color region of which a frequency exceeds the threshold value (see FIG. 6), the image analysis unit 101A proceeds back to the step ST12 to change the color information analysis region. In this case, a color information analysis region after the change (a second image region) is downsized in comparison with the color information analysis region before the change (a first image region) (see FIG. 3 and FIG. 4).

On the other hand, when it is determined that there is a color region of which a frequency exceeds the threshold value (see FIG. 7 and FIG. 8), the image analysis unit 101A determines in a step ST15 whether or not there is a change in photography state. When it is determined that there is no change, the image analysis unit 101A proceeds back to the step ST12 to set the color information analysis region to the initial state, that is, the entire screen, and repeats the same process as described above.

When it is determined that there is a change in photography state, the image analysis unit 101A proceeds to a process of a step ST16. Also, when it is determined in the step ST14 that there is a color region of which a frequency exceeds the threshold value for the first time after the process is started in the step S11, the image analysis unit 101A directly proceeds to the process of the step ST16.

In this step ST16, the image analysis unit 101A determines at least one color region among color regions of which frequencies exceed the threshold value as an extraction color region, and outputs information on the extraction color region on the screen. This process is the same as the process performed by the image analysis unit 101 of the image processing apparatus 100 of FIG. 1 in the step ST5 of FIG. 2. As mentioned above, the image analysis unit 101A proceeds to the process of the step ST16 only when it is determined that there is a change in photography state other than the first time after the process is started in the step S11. In this way, the determined extraction color region is updated when there is a change in photography state.

After the process of the step ST16, the image analysis unit 101A proceeds back to the step ST12 to set the color information analysis region to the initial state, that is, the entire screen, and repeats the same process as described above.

Referring back to FIG. 9, the image processing unit 102 performs image processing on the captured image signal SVa on the basis of the extraction color region determined by the image analysis unit 101A, and thereby obtains a processed image signal SVb. In this case, the image processing unit 102 performs image processing on the extraction color region of the captured image signal SVa and/or the remaining region of the captured image signal SVa excluding the extraction color region. The image processing unit 102 performs, for example, a process of emphasizing saturation on the extraction color region of the captured image signal SVa. Also, the image processing unit 102 performs, for example, achromatic coloring, that is, the process of dropping saturation to zero, on the remaining region of the captured image signal SVa excluding the extraction color region.

The output unit 104 performs a process of outputting the processed image signal SVb output from the image processing unit 102 to the outside. For example, the output unit 104 records the processed image signal SVb as a JPEG image file in a recording medium, such as a memory card.

Operation of the digital still camera 100A shown in FIG. 9 will be described. The captured image signal SVa, which is obtained by photographing a subject using the imaging unit 103, is supplied to the image analysis unit 101A and the image processing unit 102. Also, additional information Iadd, which is output from the imaging unit 103 and includes information on a focus point, information on a detection position of a specific object, and the like, is supplied to the image analysis unit 101A. The image analysis unit 101A determines an extraction color region including at least a partial region in an image using color information of the captured image signal SVa, and supplies information on the region to the image processing unit 102.

The image processing unit 102 performs image processing on the captured image signal SVa on the basis of the extraction color region determined by the image analysis unit 101A, thereby obtaining the processed image signal SVb. In this case, the image processing unit 102 performs image processing on the extraction color region of the captured image signal SVa and/or the remaining region of the captured image signal SVa excluding the extraction color region. For example, a process of achromatic coloring is performed on the remaining region of the captured image signal SVa excluding the extraction color region, and thereby the so-called partial color effect is implemented.

The processed image signal SVb obtained by the image processing unit 102 is supplied to the output unit 104. The output unit 104 performs the process of outputting the processed image signal SVb to the outside. For example, the output unit 104 records the processed image signal SVb as a JPEG image file in a recording medium, such as a memory card.

As described above, in the digital still camera 100A shown in FIG. 9, the image analysis unit 101A of the camera body unit 110 automatically determines at least one extraction color region using color information of the captured image signal SVa. For this reason, the image processing unit 102 of the camera body unit 110 can reliably perform image processing on the captured image signal SVa on the basis of information on the extraction color region. For example, the process of achromatic coloring is performed on the remaining region of the captured image signal SVa excluding the extraction color region, so that the so-called partial color effect can be reliably implemented.

Also, when it is impossible to determine an extraction color region, the image analysis unit 101A of the camera body unit 110 in the digital still camera 100A shown in FIG. 9 changes a color information analysis region with a downsized region and performs the process of determining an extraction color region again. For this reason, it is possible to automatically determine at least one extraction color region. At this time, if the color information analysis region is downsized toward a focus point, it is possible to determine a color region more preferred by a user as an extraction color region.

Further, when there is a change in photography state, the image analysis unit 101A of the camera body unit 110 in the digital still camera 100A shown in FIG. 9 updates the determined extraction color region. For this reason, the extraction color region determined by the image analysis unit 101A does not vary unless a user clearly performs change of an exposure mode, zoom handling, and the like using the user manipulation unit 113. Thus, it is possible to prevent the extraction color region from gradually varying due to a minute difference in view angle or motion of a subject that the user does not intend.

In the flowchart shown in FIG. 10, the process of the step ST12 to the step ST14 is repeatedly performed even when there is no change in photography state. However, the processing sequence may be set to perform the process of these steps ST12 to ST14 and determine an extraction color region only when there is a change in photography state.

<3. Variation>

In the above-described embodiments, it has been described that, when there are a plurality of color regions of which frequencies exceed a threshold value (see FIG. 8), the image analysis units 101 and 101A determine, for example, one color region or a predetermined number of color regions in decreasing frequency order among the plurality of color regions as extraction color regions. When there are many color regions of which frequencies exceed the threshold value like this, a color region to be determined as an extraction color region may be configured to be selected by a user. An operation example of the image analysis unit 101A and the like in this case will be described.

An operation example of the image analysis unit 101A and the like in this case will be described. For example, in the flowchart of FIG. 10, when there is a change in photography state in the step ST15, the CPU 111 determines in a step ST17 whether or not there are two or more color regions of which frequencies exceed the threshold value. When there is only one color region of which a frequency exceeds the threshold value, the image analysis unit 101A directly proceeds to the process of the step ST16 and determines the color region as an extraction color region.

Figure 11:
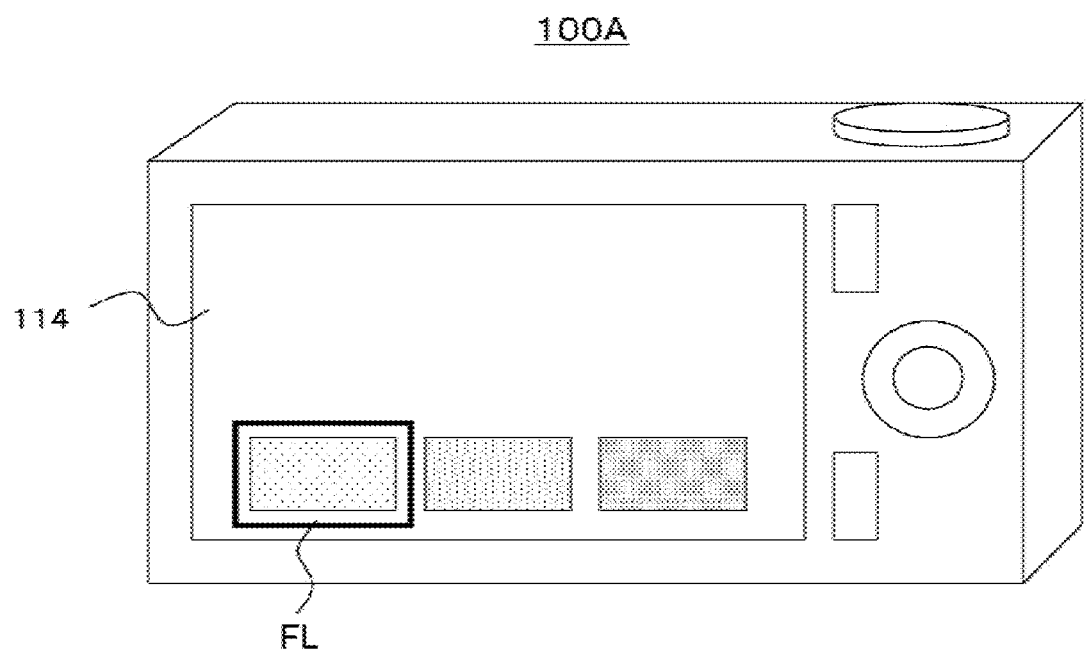
FIG. 11 is a diagram showing a displayed example of candidate color regions in a digital still camera.

On the other hand, when it is determined that there are two or more color regions of which frequencies exceed the threshold value, the CPU 111 displays N color regions (N is an integer equal to or greater than 2) in decreasing frequency order among the color regions as candidate color regions on the display unit 114 in a step ST18. In this way, a user is prompted to select the extraction color region. FIG. 11 shows a displayed example of candidate color regions in the display unit 114 of the digital still camera 100A. In this example, three candidate color regions are displayed by rectangles painted in the colors.

Next, in a step ST19, the user manipulates the user manipulation unit 113 on the basis of the display of the display unit 114 to select a color region to be determined as an extraction color region. The example of FIG. 11 shows a state in which one color region on the left is selected and surrounded by a boundary FL. After the user selection in the step ST19, the image analysis unit 101A determines the predetermined number of color regions selected by the user as extraction color regions in the step ST16.

In this way, when there are a plurality of color regions of which frequencies exceed the threshold value, a user is made to select a color region to be determined as an extraction color region, so that a color region preferred by the user can be determined as an extraction color region.

It has been described above that candidate color regions are displayed on the display unit 114 of the digital still camera 100A, and a user manipulates the user manipulation unit 113 of the digital still camera 100A to select a color region to be determined as an extraction color region. However, a display unit that displays the candidate color regions may be an external device. Also, a manipulation unit with which the user performs the selection manipulation may be an external device such as a remote controller or a device over a network.

In other words, the digital still camera 100A, which is an image processing apparatus, may have a user selection acquisition unit's function of causing a display unit to display N regions (N is an integer equal to or greater than 2) in decreasing frequency order among a plurality of color regions of which frequencies exceed a threshold value as candidate color regions, and prompting a user to select an extraction region on the basis of the display of the display unit.

In the above-described embodiments, when there is no color region of which a frequency exceeds a threshold value, a color information analysis region is gradually downsized toward a screen center or a focus point on a screen. However, this process is merely an option, and may not be performed. In this case, for example, one color region or a predetermined number of color regions in decreasing frequency order are simply determined as extraction color regions without using a threshold value.

Also, in the above-described embodiments, processing of the image analysis units 101 and 101A and the image processing unit 102 can be performed by software as well as hardware. When the processing is performed by hardware, a program in which a processing sequence is recorded is installed in a memory in a computer implemented in dedicated hardware and executed. Alternatively, the program can be installed in a general purpose computer capable of performing various kinds of processing and executed.

The present technology can have a configuration as follows.

(1) An image processing apparatus including an extraction color region determination unit that performs a process of determining an extraction color region including at least a partial region in an image using color information of an input image signal, and an image processing unit that performs image processing on the extraction color region of the input image signal determined by the extraction color region determination unit and/or the remaining region of the input image signal excluding the extraction color region, to obtain an output image signal.

(2) The image processing apparatus stated in (1) above, in which, when it is impossible to determine the extraction color region in a first image region, the extraction color region determination unit performs the process of determining the extraction color region in a second image region that is smaller than the first image region.

(3) The image processing apparatus stated in (2) above, in which the extraction color region determination unit performs a process of assigning every pixel or every block including a predetermined number of pixels in the first image region to any one of a plurality of color regions, and, as a result thereof, when there are color regions of which frequencies exceed a threshold value, the extraction color region determination unit determines at least one color region among the color regions as the extraction color region, and when there is no region of which a frequency exceeds the threshold value, the extraction color region determination unit performs the process of determining the extraction color region in the second image region that is smaller than the first image region.

(4) The image processing apparatus stated in (2) or (3) above in which the extraction color region determination unit determines an image region obtained by downsizing the first image region toward a screen center as the second image region.

(5) The image processing apparatus stated in (2) or (3) above in which the extraction color region determination unit determines an image region obtained by downsizing the first image region toward a focus point on a screen as the second image region.

(6) The image processing apparatus stated in (1) or (2) above in which the extraction color region determination unit performs a process of assigning every pixel or every block including a predetermined number of pixels in a predetermined image region to any one of a plurality of color regions, and determines the extraction color region on the basis of a frequency of each color region.

(7) The image processing apparatus stated in (6) above in which, when there are a plurality of color regions of which frequencies exceed a threshold value, the extraction color region determination unit determines a predetermined number of color regions in order of decreasing frequency as the extraction color region.

(8) The image processing apparatus stated in (6) above in which, when there are a plurality of color regions of which frequencies exceed a threshold value, the extraction color region determination unit prompts a user to select the extraction color region.

(9) The image processing apparatus stated in (8) above further including a user selection acquisition unit that displays N regions (N is an integer equal to or greater than 2) in decreasing frequency order among the plurality of color regions of which the frequencies exceed the threshold value as candidate color regions on a display unit, and prompts the user to select the extraction color region on the basis of the display of the display unit.

(10) The image processing apparatus stated in any one of (1) to (9) above in which, when a photography condition of the input image signal varies, the extraction color region determination unit updates the determined extraction color region.

(11) An image processing method including an extraction color region determination step of performing a process of determining an extraction color region including at least a partial region in an image using color information of an input image signal, and an image processing step of performing image processing on the extraction color region of the input image signal determined in the extraction color region determination step and/or the remaining region of the input image signal excluding the extraction color region, to obtain an output image signal.

(12) A program for causing a computer to function as an extraction color region determination unit which performs a process of determining an extraction color region including at least a partial region in an image using color information of an input image signal, and an image processing unit which performs image processing on the extraction color region of the input image signal determined by the extraction color region determination unit and/or the remaining region of the input image signal excluding the extraction color region, to obtain an output image signal.

(13) An imaging apparatus including an imaging unit, an extraction color region determination unit which performs a process of determining an extraction color region including at least a partial region in an image using color information of a captured image signal obtained by the imaging unit, and an image processing unit which performs image processing on the extraction color region of the captured image signal determined by the extraction color region determination unit and/or the remaining region of the captured image signal excluding the extraction color region, to obtain a processed image signal.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-111350 filed in the Japan Patent Office on May 18, 2011, the entire content of which is hereby incorporated by reference.

What is claimed is:

1. An image processing apparatus, comprising:
at least one circuit configured to:
perform a first process of determining an extraction color region including at least a first partial region in an image using color information of an input image signal;
when the extraction color region is not determined by the first process, perform a second process of determining the extraction color region including a second partial region in the image, wherein the second partial region is different from the first partial region; and
perform image processing on the extraction color region of the input image signal and/or the remaining region of the input image signal excluding the extraction color region, to obtain an output image signal.

2. The image processing apparatus according to claim 1, wherein an area of the second partial region is smaller than an area of the first partial region.

3. The image processing apparatus according to claim 2, wherein the at least one circuit is further configured to perform a process of assigning every pixel or every block including a predetermined number of pixels in the first partial region to any one of a plurality of color regions, and, as a result thereof, when there are color regions of which frequencies exceed a threshold value, the at least one circuit determines at least one color region among the color regions as the extraction color region, and when there is no region of which a frequency exceeds the threshold value, the at least one circuit performs the process of determining the extraction color region in the second partial region that is smaller than the first partial region.

4. The image processing apparatus according to claim 2, wherein the at least one circuit determines an image region obtained by downsizing the first partial region toward a screen center as the second partial region.

5. The image processing apparatus according to claim 2, wherein the at least one circuit determines an image region obtained by downsizing the first partial region toward a focus point on a screen as the second partial region.

6. The image processing apparatus according to claim 1, wherein the at least one circuit performs a process of assigning every pixel or every block including a predetermined number of pixels in a predetermined image region to any one of a plurality of color regions, and determines the extraction color region on the basis of a frequency of each color region of the plurality of color regions.

7. The image processing apparatus according to claim 6, wherein, when there are a plurality of color regions of which frequencies exceed a threshold value, the at least one circuit determines a predetermined number of color regions in order of decreasing frequency as the extraction color region.

8. The image processing apparatus according to claim 6, wherein, when there are a plurality of color regions of which frequencies exceed a threshold value, the at least one circuit prompts a user to select the extraction color region.

9. The image processing apparatus according to claim 8, wherein the at least one circuit is further configured to:
display N regions (N is an integer equal to or greater than 2) in decreasing frequency order among the plurality of color regions of which the frequencies exceed the threshold value as candidate color regions on a display unit, and
prompt the user to select the extraction color region on the basis of the display of the display unit.

10. The image processing apparatus according to claim 1, wherein, when a photography condition of the input image signal varies, the at least one circuit updates the determined extraction color region.

11. The image processing apparatus according to claim 1, further comprising:
an imaging unit configured to obtain the captured image signal.

12. The image processing apparatus according to claim 1, wherein the second partial region is more toward a specific object of the image than the first partial region.

13. An image processing method, comprising acts of:
performing a first process of determining an extraction color region including at least a first partial region in an image using color information of an input image signal;
when the extraction color region is not determined by the first process, performing a second process of determining the extraction color region including a second partial region in the image, wherein the second partial region is different from the first partial region; and
performing image processing on the extraction color region of the input image signal and/or the remaining region of the input image signal excluding the extraction color region, to obtain an output image signal.

14. At least one non-transitory computer readable storage device configured to store computer executable instructions that, when executed by a computer, perform a method comprising acts of:
performing a first process of determining an extraction color region including at least a first partial region in an image using color information of an input image signal;
when the extraction color region is not determined by the first process, performing a second process of determining the extraction color region including a second partial region in the image, wherein the second partial region is different from the first partial region; and
performing image processing on the extraction color region of the input image signal and/or the remaining region of the input image signal excluding the extraction color region, to obtain an output image signal.

15. An image processing method, comprising acts of:
performing a process of determining an extraction color region including at least a partial region in an image using color information of an input image signal, wherein the process of determining an extraction color region comprises:
assigning every pixel or every block including a predetermined number of pixels in a predetermined image region to any one of a plurality of color regions; and
determining the extraction color region on the basis of a frequency of each color region of the plurality of color regions; and
performing image processing on the extraction color region of the input image signal and/or the remaining region of the input image signal excluding the extraction color region, to obtain an output image signal.

16. An image processing method, comprising acts of:
performing a process of determining an extraction color region including at least a partial region in an image using color information of an input image signal; and
performing image processing on the extraction color region of the input image signal and/or the remaining region of the input image signal excluding the extraction color region, to obtain an output image signal,
wherein, when a photography condition of the input image signal varies, updating the determined extraction color region.

* * * * *